Patented July 4, 1933

1,916,841

UNITED STATES PATENT OFFICE

HERMANN KLIPPEL, OF LUDWIGSHAFEN-ON-THE-RHINE, AND ERNST JAENECKE, OF HEIDELBERG, GERMANY, ASSIGNORS TO I. G. FARBENINDUSTRIE AKTIENGESELL-SCHAFT, OF FRANKFORT-ON-THE-MAIN, GERMANY

AMMONIUM NITRATE-SULPHITE FERTILIZER SALT AND METHOD OF MAKING SAME

No Drawing. Application filed June 3, 1931, Serial No. 541,948, and in Germany June 7, 1930.

The present invention relates to new fertilizers containing a high percentage of nitrogen and to a process for making such new fertilizers.

We have found that by leading sulphur dioxide and ammonia, substantially in the proportion, by volume, of 1:2, or gas mixtures containing these substances, into aqueous solutions of ammonium nitrate a compound of the formula $NH_4NO_3 \cdot (NH_4)_2SO_3$ is obtained which readily separates in a solid form when the solution is sufficiently concentrated.

The ammonia and sulphur dioxide, or the gas mixtures containing the same, are preferably led into an almost saturated solution of ammonium nitrate, preferably at room temperature until about 1 molecular proportion of sulphur dioxide and 2 molecular proportions of ammonia have been introduced for each molecular proportion of ammonium nitrate. The said compound is thereby immediately precipitated and may be filtered off. The mother liquor may then be employed in a simple manner for the production of further amounts of the compound $$NH_4NO_3 \cdot (NH_4)_2SO_3$$

after the addition of solid ammonium nitrate or ammonium nitrate solution. It is possible to use solutions of ammonium nitrate for this purpose because the formation of the new salt from ammonia and sulphur dioxide proceeds with the absorption of water. It is also possible to obtain the new compound directly by bringing together the amounts of ammonium nitrate, ammonia, sulphur dioxide and water necessary for the formation of the said compound, without employing an appreciable excess of water.

By oxidizing the resulting compound in any suitable manner, a high percentage nitrogen fertilizer is obtained which does not contain constituents injurious to plants and which has good properties as regards both storage and scattering. The oxidation may be effected in different ways, as for example by merely storing the new compound in the air or preferably by the action of heated air. It is even possible to employ the compound $NH_4NO_3 \cdot (NH_4)_2SO_3$ itself as a fertilizer or as a constituent of mixed fertilizers, since the said compound is not injurious to the plants and since oxidation readily takes place in the soil.

The content of nitrogen may be still further increased by the addition of ammonium nitrate.

The following example will further illustrate the nature of this invention, but the invention is not restricted to this example. The parts are by weight.

Example

Gaseous ammonia and sulphur dioxide in the proportion, by volume, of 2:1 are led into a solution of 800 parts of ammonium nitrate in 500 parts of water until an increase in weight of 263 parts has taken place with an approximately neutral reaction. The quantity of the compound $NH_4NO_3 \cdot (NH_4)_2SO_3$ which separates out amounts to 326 parts. After oxidizing the resulting double salt by means of heated air, a fertilizer salt is obtained having a nitrogen content of 27 per cent.

What we claim is:—

1. As a new article of manufacture the double compound of the formula $$NH_4NO_3 \cdot (NH_4)_2SO_3.$$

2. As new articles of manufacture, fertilizers comprising the double compound of the formula $NH_4NO_3 \cdot (NH_4)_2SO_3$.

3. The process of producing a double salt suitable for fertilizing purposes which comprises contacting ammonia and sulphur dioxide with ammonium nitrate in the presence of water.

4. The process of producing a double salt suitable for fertilizing purposes which comprises contacting ammonia and sulphur dioxide, in about the molecular proportion of 2 to 1, with ammonium nitrate in the presence of water.

5. The process of producing a double salt suitable for fertilizing purposes which comprises contacting ammonia and sulphur dioxide, in about the molecular proportion of 2 to 1, with ammonium nitrate in the presence of water, in about the proportion required for the production of the double compound of the formula $NH_4NO_3.(NH_4)_2SO_3$.

6. The process of producing a double salt suitable for fertilizing purposes which comprises introducing ammonia and sulphur dioxide, in about the molecular proportion of 2 to 1, into an aqueous solution of ammonium nitrate, until the weight of the solution is increased by about 263 parts for each 800 parts of ammonium nitrate present.

7. The process of producing a double salt suitable for fertilizing purposes which comprises contacting ammonia and sulphur dioxide with ammonium nitrate in the presence of water and oxidizing the resulting double salt.

In testimony whereof we have hereunto set our hands.

HERMANN KLIPPEL.
ERNST JAENECKE.